United States Patent [19]

Schulz

[11] 4,370,363

[45] Jan. 25, 1983

[54] COATING COMPOUND FOR SILICA BRICKS

[75] Inventor: Peter Schulz, Bochum, Fed. Rep. of Germany

[73] Assignee: Dr. C. Otto & Comp. G.m.b.H, Bochum, Fed. Rep. of Germany

[21] Appl. No.: 292,890

[22] Filed: Aug. 14, 1981

[30] Foreign Application Priority Data

Sep. 2, 1980 [DE] Fed. Rep. of Germany ....... 3032920

[51] Int. Cl.$^3$ .......................... B05D 3/02; B05D 1/02; B05D 7/22; B05D 1/28
[52] U.S. Cl. ...................................... 427/230; 427/379
[58] Field of Search ................................ 427/230, 379

[56] References Cited

U.S. PATENT DOCUMENTS

| 1,761,343 | 6/1930 | Holzapfel | 427/230 X |
| 3,663,290 | 5/1972 | Klinge | 427/379 X |

*Primary Examiner*—James R. Hoffman
*Attorney, Agent, or Firm*—Thomas H. Murray

[57] ABSTRACT

A coating compound for silica bricks, particularly silica bricks intended for use in the construction of pitch coke ovens, where it is necessary to protect the bricks against penetration of liquid and gaseous substances and impede the formation of graphite incrustations. The bricks are coated with a suspension of water-glass powder and glass powder together with a stabilizer such as hydroxyethyl cellulose in a concentrated water solution. After being coated with the suspension, the bricks are dried and baked to produce a substantially sealed and smooth surface.

8 Claims, No Drawings

COATING COMPOUND FOR SILICA BRICKS

BACKGROUND OF THE INVENTION

As is known, the porosity of silica bricks may range between about 15% and 25%, the number of closed pores in the bricks being less than 1% because of their low glass content. As a result, silica bricks do not have an impervious fired skin, their permeability being no higher than chamotte bricks having the same total porosity. They also tend to absorb liquids and gases and, compared with chamotte bricks, have a relatively rough surface which promotes condensation and adhesion of tar and graphite in coke ovens. Such silica bricks are particularly susceptible to the penetration of hot liquid pitch or tar. When silica bricks are used in coke ovens, their structure disintegrates in the pores of the bricks and relatively large areas of brickwork wear out prematurely in certain zones of the coke oven.

It is known to seal silica bricks, particularly silica bricks used in coke ovens, by spraying or brushing on compounds which consist mainly of a refractory material such as silicon dioxide, mullite, corundum or the like, fluxing agents such as glass powder, water-glass, borax or phosphate and plasticizers which consist of clay, glue, dextrin or the like. Because of their relatively high refractory properties, these compounds do not adhere well to hot walls, even when sprayed on. They are used primarily for repairing cracked, leaky brickwork areas to provide only temporary improvement.

In another known method, very high temperature flames are used (e.g., an acetylene/oxygen flame) to heat the surfaces of the silica walls to a temperature such that refractory material applied to the walls by blasting adheres thereto by fusion. This method is extremely expensive and has not become generally accepted.

The prior art also includes glazes and protective coatings for refractory products which involve the use of refractory material or extremely expensive raw materials. Such protective coatings are disclosed, for example, in German Offenlegungsschrift No. 29 37 997, in which silicon nitride or oxynitride is used for ceramic hot conductors. German Offenlegungsschrift No. 16 46 497 relates to a process for coating articles with silicon carbide to produce a hard wear-resistant surface, wherein a metal or carbon article at a temperature of 1150° C. is dipped into organic silicon compounds. German Offenlegungsschrift No. 17 71 733 discloses a refractory protective coating which is said to have a thickness of 20–50 millimeters and contains 40%–60% aluminum oxide. The coating compound disclosed in the German Offenlegungsschrift No. 17 71 623, is also refractory, containing only up to 4% of a mineral mixture which is not refractory. German Auslegeschrift No. 22 23 142 relates to an alkali-free silicon dioxide suspension which does not involve a glaze. The coating compound disclosed in German Auslegeschrift No. 13 02 596 also has a very high solids content. The melting point of the coating, which is intended for use in coating porous chamotte bricks, is said to be 150° higher than the melting temperature of the brick itself.

All of the foregoing prior art methods are either extremely expensive or are not altogether satisfactory for their intended purpose.

SUMMARY OF THE INVENTION

In accordance with the present invention, the disadvantages of prior art coatings for silica bricks used in coke ovens are obviated with the use of a suspension of water-glass powder and glass powder in a concentrated water-glass solution. The suspension is applied to a fired or unfired silica brick; and is thereafter dried and baked in. This procedure gives a substantially sealed and smooth surface. The fused glaze, which contains no refractory components, penetrates only a few millimeters into the brick and in so doing fills the surface pores. In this regard, the absorption of silicon dioxide in the brick into the coating so increases the viscosity of the melt that it "sticks" to the brick. This prevents any further damage to the brick structure by the basic glaze. The permeability of the brick drops to about 1/10 of its original value when coated with the coating of the invention.

DETAILED DESCRIPTION OF THE INVENTION

The suspension of the invention, comprising water-glass powder and glass powder in a concentrated water-glass solution, can be applied conventionally by brushing, spraying or other known methods. A stabilizer such as hydroxyethyl cellulose can be added to the solution. It has been found advantageous for the suspension applied to the silica bricks to be dried at a temperature of about 110° C., followed by baking at a temperature of 1420° C. for a period of about six days. The suspension can also be applied to the inner walls of coke oven chambers already constructed and treated in the method described above. The water-glass powder is essentially sodium silicate in powdered form; while the glass powder may comprise a powder of any common glass such as a glass formed from sodium calcium silicate. The water-glass solution is typically a 38° Be liquid sodium silicate solution.

EXAMPLE 1.5 kilograms of water-glass powder and 3.0 kilograms of glass powder, together with 15 grams of hydroxyethyl cellulose were added with agitation to 6 kilograms of 38° Be water-glass solution. The fired silica brick was first coated with a pure water-glass solution. Thereafter, the suspension was applied to the surface of the bricks in three coats by brushing. The glaze rapidly dried and immediately after application was dried at a temperature of 110° C. in a tunnel drier. The dried glaze, at this point, adhered firmly to the brick surface. The bricks were then fired in a tunnel kiln at a temperature of 1420° C. for a period of six days.

After six days of firing as described above, the permeability of the brick was 1.5 nP as compared with 13.5 nP for an untreated brick.

Although the invention has been shown in connection with a certain specific embodiment, it will be readily apparent to those skilled in the art that various changes in composition and method steps may be made to suit requirements without departing from the spirit and scope of the invention.

I claim as my invention:

1. A method for glazing the surfaces of silica bricks used in coke ovens, which comprises forming a suspension of water-glass powder and glass powder in a concentrated water-glass solution, applying the suspension in solution to the surfaces of silica bricks, drying said bricks, and then baking said bricks to form a protective layer which will prevent the penetration of liquid and gaseous substances into the brick.

2. The method of claim 1 including the step of adding to said concentrated water-glass solution a stabilizer.

3. The method of claim 2 wherein said stabilizer comprises hydroxyethyl cellulose.

4. The method of claim 1 wherein said water-glass solution comprises a 38° Be water-glass solution.

5. The method of claim 1 wherein said suspension in the concentrated water-glass solution comprises about 50 parts by weight of glass powder, 25 parts by weight of water-glass powder, and 0.025 part by weight of hydroxyethyl cellulose.

6. The method of claim 5 wherein said suspension is added to 100 parts by weight of the water-glass solution.

7. The method of claim 6 wherein said bricks are dried at a temperature of about 110° C. and are then baked at 1420° C. for a period of about six days.

8. The method of claim 1 wherein said suspension in a concentrated water-glass solution is applied to the inner walls of already-bricked coke ovens.

* * * * *